US005723366A

United States Patent [19]
Suzuki et al.

[11] Patent Number: 5,723,366
[45] Date of Patent: Mar. 3, 1998

[54] DRY ETCHING METHOD, METHOD OF FABRICATING SEMICONDUCTOR DEVICE, AND METHOD OF FABRICATING LIQUID CRYSTAL DISPLAY DEVICE

[75] Inventors: Koji Suzuki; Kaoru Takeda, both of Ogaki; Yoshihiro Morimoto, Inazawa; Kiyoshi Yoneda, Motosu-gun, all of Japan

[73] Assignee: Sanyo Electric Co. Ltd., Moriguchi, Japan

[21] Appl. No.: 535,449

[22] Filed: Sep. 28, 1995

[30] Foreign Application Priority Data

Sep. 28, 1994 [JP] Japan .................. 6-233474
Jul. 3, 1995 [JP] Japan .................. 7-167514

[51] Int. Cl.⁶ ........................... H01L 21/465
[52] U.S. Cl. ............ 437/228; 156/646.1; 156/650.1; 156/651.1
[58] Field of Search ............. 437/228, 41; 156/646.1, 156/650.1, 657.1, 643.1

[56] References Cited

U.S. PATENT DOCUMENTS 5,318,664  6/1994  Saia .......................... 156/643

FOREIGN PATENT DOCUMENTS 60-234325  11/1985  Japan .
2-158129   6/1990   Japan .

*Primary Examiner*—John Niebling
*Assistant Examiner*—Brendan Mee
*Attorney, Agent, or Firm*—W. G. Fasse; W. F. Fasse

[57] ABSTRACT

A dry etching method includes the steps of etching a transparent electrode film by reactive ion etching with a first etching gas, changing the first etching gas to a second etching gas, and etching the transparent electrode film by reactive ion etching with the second etching gas. A chlorine containing gas is employed as the second etching gas.

18 Claims, 8 Drawing Sheets

FIG. 18

DRY ETCHING METHOD, METHOD OF FABRICATING SEMICONDUCTOR DEVICE, AND METHOD OF FABRICATING LIQUID CRYSTAL DISPLAY DEVICE

BACKGROUND OF THE INVENTION

1. Field of the Invention

The present invention relates to a dry etching method for a transparent electrode film, and methods of fabricating a semiconductor device and a liquid crystal display device employing the dry etching method.

2. Description of the Background Art

In a display semiconductor device such as a liquid crystal display (LCD) which is represented by an active matrix system LCD or a photovoltaic device such as a solar cell, it is necessary to introduce and discharge "light" into and from the device. Therefore, a transparent conductive material such as an oxide of indium such as $In_2O_3$, ITO (indium tin oxide) which is a mixture of $In_2O_3$ and $SnO_2$, $SnO_2$ (tin oxide) or ZnO (zinc oxide) is employed as an electrode material.

In order to pattern a transparent electrode film consisting of such a transparent conductive material into a prescribed shape, a wet etching method of dipping the electrode in a hydrochloric acid solution, for example, or a dry etching method such as a reactive ion etching (RIE) method is employed.

In the wet etching method, however, transverse etching called side etching or undercutting results from isotropic progress of the etching, to exert a bad influence on fine etching. In recent years, therefore, the RIE method allowing unidirectional progress of etching is employed by choice.

In the RIE method, the etching chamber is evacuated and a reaction gas such as $CF_4$ is introduced thereinto, and high-frequency power is applied from a high-frequency power source, thereby causing discharge and generating a plasma. In this plasma, the gas dissociates due to collision with electrons which are accelerated by the electric field, to generate ions as well as atoms and molecules which are extremely chemically active. The RIE method utilizes the ions which are generated by dissociation of the reaction gas. When the reaction gas is $CF_4$, cations such as $CF_3^+$ and $CF_2^+$ are generated. The cations thus generated are accelerated by the electric field so that the same collide with an object to be etched, thereby carrying out the etching. Impact of such ions is caused only in the direction of depth, whereby the etching progresses only in the vertical direction, as anisotropic etching.

Japanese Patent Laying-Open No. 2-158129 (1990) (International Patent Classification: H01L21/302) describes a technique of etching a transparent electrode film through the RIE method. According to the technique described in this publication, an ITO film which is formed on an amorphous silicon film is etched through the RIE method with a mixed gas of chlorine ($Cl_2$) and methane ($CH_4$).

In such an etching method, however, C and H which are contained in methane dissociate in a plasma, to result in a deposit consisting of a compound containing C and H. Such a deposit adheres to the underlayer of the ITO film and the wall surface of the etching chamber and floats in the etching chamber, to disadvantageously contaminate the semiconductor substrate. Thus, the etching chamber must be frequently cleaned, leading to hindrance of the fabrication steps.

SUMMARY OF THE INVENTION

An object of the present invention is to provide an etching method which can carry out etching with high accuracy without causing contamination of the etching chamber and the object of etching.

A dry etching method according to the present invention comprises the steps of etching a transparent electrode film by reactive ion etching with a first etching gas, changing the first etching gas for, i.e., to a second etching gas, and etching the transparent electrode film by reactive ion etching with the second etching gas, and is characterized in that a chlorine containing gas is employed as the second etching gas.

The etching with the second etching gas is preferably carried out in the final stage of the etching steps. Therefore, the etching step with the second etching gas is preferably adapted to carry out the etching up to completion thereof. It is possible to remove a deposit caused in the precedent etching step by employing the chlorine containing gas as the second etching gas, thereby carrying out the etching in a cleaner state.

The chlorine containing gas can be prepared from $Cl_2$ gas, $BCl_3$ gas, or a mixed gas thereof. This chlorine containing gas may be diluted with an inert gas such as helium, or may contain another etching gas in a small amount. When another etching gas is contained, the chlorine containing gas preferably occupies at least 80 percent by volume.

Comparing the $Cl_2$ gas and the $BCl_3$ gas with each other, the $Cl_2$ gas is preferable in order to carry out the etching in a clean state, while the $BCl_3$ gas is preferable in consideration of selectivity for a resist film.

When the chlorine containing gas is prepared from $Cl_2$ gas, the first etching gas is preferably prepared from a gas having excellent selectivity for the resist film since the $Cl_2$ gas has inferior selectivity for the resist film. Examples of such an etching gas are HBr gas and HI gas. Thus, it is preferable to carry out the etching with an etching gas such as HBr gas having excellent selectivity for the resist film for serving as the first etching gas, and to change the same for $Cl_2$ gas in the final stage of the etching steps. While the time for changing the etching gas is not particularly restricted, the etching gas may be changed when the underlayer of the transparent conductive film starts being exposed, for example. Due to such selection of the etching gases, the etching can be accurately carried out with excellent selectivity for the resist film and in a clean state. The selection ratios of the HBr gas, the $Cl_2$ gas and the $BCl_3$ gas to the resist film are 1 to 1.5, 0.2 to 0.3 and 1 to 1.5 respectively. The selection ratio to the resist film means the ratio of the etching rate for the transparent electrode film to the etching rate for the resist film.

When the chlorine containing gas is prepared from a mixed gas of $Cl_2$ gas and $BCl_3$ gas, the ratio of $Cl_2$ to $BCl_3$ is preferably within the range of 0.5:5 to 2:5. The $BCl_3$ gas is superior to the $Cl_2$ gas in selection ratio to the resist film, whereby the etching can be accurately carried out in a clean state by employing this mixed gas.

According to the present invention, the transparent conductive film to be etched is a transparent conductive oxide film in general. In more concrete terms, examples of such a transparent conductive film are an ITO film, an $In_2O_3$ film (indium oxide film), an $SnO_2$ film (tin oxide film) and a ZnO film (zinc oxide film).

When an ITO film is etched with $Cl_2$ gas by reactive ion etching, for example, tin oxide and indium oxide contained in the ITO film are decomposed and etched according to the following reaction formulas:

$$SnO_2 + 2Cl_2 \rightarrow SnCl_4\uparrow + O_2\uparrow$$

$$2In_2O_3 + 6Cl_2 \rightarrow 4InCl_3\uparrow + 3O_2\uparrow$$

When a patterned resist film is provided on the transparent electrode film, $CO_2$ gas is generated through reaction with the resist film, which in turn is also decomposed and etched.

When an ITO film is etched with HBr gas by reactive ion etching, on the other hand, tin oxide and indium oxide contained in the ITO film are decomposed and etched according to the following reaction formulas:

$$SnO_2 + 4HBr \rightarrow SnBr_4\uparrow + 2H_2O\uparrow$$

$$In_2O_3 + 6HBr \rightarrow 2InBr_3\uparrow + 3H_2O\uparrow$$

As hereinabove described, the HBr gas has high selectivity and a small degree of etching to the resist film. Therefore, the etching is preferably carried out by first employing the HBr gas as the etching gas. Thus, an ITO film whose etching region is patterned by a resist film can be accurately etched. Then, the etching gas is changed for $Cl_2$ gas, whereby a deposit (compound containing C and H) which results from reaction of the resist film and HBr can be decomposed as $CCl_2\uparrow$, $H_2\uparrow$ and $HCl\uparrow$. Thus, the deposit adhering to the underlayer of the ITO film and the etching chamber can be removed, to attain a clean surface state.

When an ITO film is etched with $BCl_3$ gas, further, tin oxide and indium oxide contained in the ITO film are decomposed and etched according to the following general reaction formulas:

$$In_2O_3 + BCl_3 \rightarrow InCl_3\uparrow + B_2O_5$$

$$SnO_2 + BCl_3 \rightarrow SnCl_4\uparrow + B_2O_5$$

A method of fabricating a semiconductor device according to the present invention comprises steps of etching a transparent conductive film by the aforementioned inventive dry etching method. Namely, the method of fabricating a semiconductor device according to the present invention comprises the steps of forming a semiconductor switching element having an electrode part, forming an insulating film on the semiconductor switching element, forming a contact hole in the insulating film for providing electrical continuity with the electrode part of the semiconductor switching element, forming a transparent electrode film in the contact hole and on the insulating film, forming a patterned resist film on the transparent electrode film, etching a region of the transparent electrode film that is not covered with the resist film by reactive ion etching with a first etching gas, changing the first etching gas for a chlorine containing gas which is a second etching gas, and etching the said region of the transparent electrode film by reactive ion etching with the second etching gas.

The semiconductor switching element is prepared from a thin-film transistor element or an MIM (metal-insulator-metal) element, for example.

An example of the semiconductor device which is fabricated according to the inventive method is a pixel driving part of a liquid crystal display device, for example.

A method of fabricating a liquid crystal display device according to the present invention comprises steps of etching a transparent electrode film into the shape of a pixel electrode by the aforementioned inventive dry etching method.

Namely, the method of fabricating a liquid crystal display device according to the present invention comprises the steps of forming a semiconductor switching element having an electrode part for driving pixels, forming an insulating film on the semiconductor switching element, forming a contact hole in the insulating film for providing electrical continuity with the electrode part of the semiconductor switching element, forming a transparent electrode film in the contact hole and on the insulating film, forming a patterned resist film on the transparent electrode film for patterning the transparent electrode film into the shape of a pixel electrode, etching a region of the transparent electrode film that is not covered with the resist film by reactive ion etching with a first etching gas, changing the first etching gas for a chlorine containing gas which is a second etching gas, and etching the said region of the transparent electrode film by reactive ion etching with the second etching gas thereby making the transparent electrode film in the shape of the pixel electrode.

According to the present invention, the chlorine containing gas is employed as an etching gas at least in the final stage of the etching steps, whereby the substrate surface and the etching chamber can be inhibited or cleaned from deposition of a reaction byproduct of the etching gas. Thus, contamination of the substrate can be prevented, and the labor for cleaning the etching chamber can be reduced.

It is possible to provide a semiconductor device and a liquid crystal display device having excellent characteristics by forming an electrode which is irradiated with light in the semiconductor device and a pixel electrode in the liquid crystal display device through the dry etching method according to the present invention.

Further, the present invention includes the following subject matters:

(1) A dry etching method employing a chlorine containing gas as an etching gas at least in the final stage for etching a transparent electrode film by reactive ion etching.

(2) A dry etching method of etching a transparent electrode film by reactive ion etching with a chlorine containing gas.

(3) A dry etching method comprising the steps of employing a gas containing hydrogen bromide (HBr) as an etching gas for etching a transparent electrode film by reactive ion etching, and changing the gas to a chlorine containing gas at least in the final stage.

(4) A dry etching method comprising the steps of forming a film containing at least $In_2O_3$ on an insulating film, and etching this film by reactive ion etching with a chlorine containing gas.

(5) A dry etching method comprising the steps of forming a film containing at least $In_2O_3$ on an insulating film, etching this film by reactive ion etching with a gas containing HBr, and changing this etching gas for a chlorine containing gas in the final stage of the etching.

(6) The dry etching method described in any of the above items (1) to (5), characterized in that the chlorine containing gas is $Cl_2$ gas, $BCl_3$ gas or a mixed gas thereof.

(7) A method of fabricating a semiconductor device by providing a film containing at least $In_2O_3$ on a semiconductor switching element through an insulating film and etching this film into a prescribed shape by reactive ion etching with a chlorine containing gas.

(8) A method of fabricating a semiconductor device by providing a film containing at least $In_2O_3$ on a semiconductor switching element through an insulating film, etching this film by reactive ion etching with a gas containing HBr, suspending the etching in the final stage of the etching and thereafter changing the etching gas for a chlorine containing gas, and resuming the etching, thereby etching the film into a prescribed shape.

(9) A method of fabricating a semiconductor device by providing a film containing at least $In_2O_3$ on a semiconductor switching element through an insulating film, and etching this film into the shape of a pixel electrode by reactive ion etching with a chlorine containing gas.

(10) A method of fabricating a liquid crystal display device by providing a film containing at least $In_2O_3$ on a semiconductor switching element through an insulating film, i.e. with an insulting film therebetween etching this film by reactive ion etching with a gas containing HBr, suspending the etching in the final stage of the etching and thereafter changing the etching gas for a chlorine containing gas, and resuming the etching, thereby etching the film into the shape of a pixel electrode.

(11) A method of fabricating a liquid crystal display device by providing an ITO (indium tin oxide) film on a semiconductor switching element through an insulating film, and etching this film into the shape of a pixel electrode by reactive ion etching with only a chlorine containing gas.

(12) A method of fabricating a liquid crystal display device by providing an ITO (indium tin oxide) film on a semiconductor switching element through an insulating film, etching this film by reactive ion etching with a gas containing HBr, suspending the etching in the final stage of the etching and thereafter changing the etching gas for a chlorine containing gas, and resuming the etching, thereby etching the film into the shape of a pixel electrode.

(13) The method of fabricating a liquid crystal display device described in any of the above items (9) to (12), characterized in that all etching steps from that of forming the semiconductor switching element to that of etching the film containing at least $In_2O_3$ are carried out by dry etching.

It is possible to simplify the fabrication steps as compared with a method employing both wet etching and dry etching, by carrying out all steps from fabrication of the semiconductor switching element such as a thin-film transistor to etching of the transparent electrode film by anisotropic dry etching along with the above item (13).

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
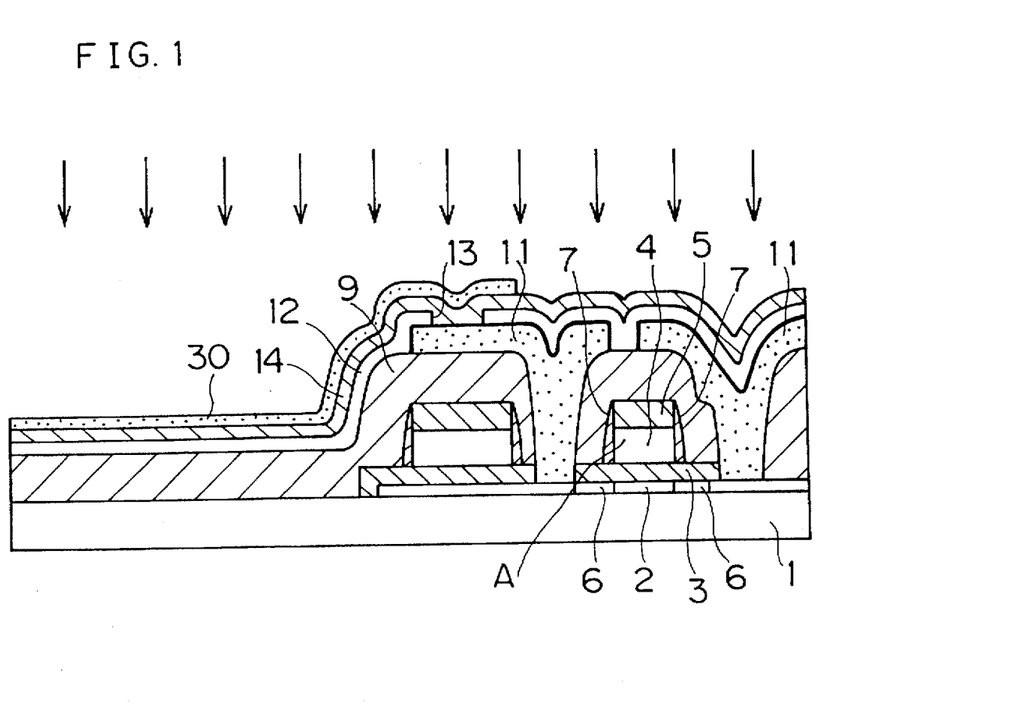
FIG. 1 is a sectional view showing an embodiment of a dry etching method according to the present invention.

FIG. 1 is a sectional view showing an embodiment of the present invention. This figure shows a step of fabricating a pixel driving part of a liquid crystal display device. A thin-film transistor (TFT) is formed on a substrate 1, and a silicon oxide film 12 is formed above the thin-film transistor. A contact hole 13 is formed in the silicon oxide film 12. An ITO film 14 is formed on the silicon oxide film 12 and in the contact hole 13, as a transparent electrode film. A patterned resist film 30 is formed on the ITO film 14. The resist film 30 is formed not on a part of the ITO film 14 to be removed by etching, but only on the remaining part to be left after the etching.

In this state, HBr is first employed as an etching gas, for etching the region of the ITO film 14 that is not covered with resist film 30 by RIE. This etching is carried out under conditions of an HBr gas flow rate of 30 sccm, an etching chamber pressure of 20 mTorr, and applied power of 400 W from a high-frequency power source, for example. Under such conditions, the etching rate is 1200 Å/min., for example. The substrate temperature is set at 80° C. in this etching.

The etching with the HBr gas is carried out until the silicon oxide film 12, which is the underlayer of the ITO film 14, starts being exposed. The exposure of the silicon oxide film 12 serving as an underlayer can be determined by observing the strength of light emission of In by a plasma and detecting change of this value. When the silicon oxide film 12 which is the underlayer starts being exposed, the etching gas is changed to $Cl_2$ gas, and the etching is continued to the end. As to conditions for the etching with the $Cl_2$ gas, the $Cl_2$ gas flow rate, the etching chamber pressure and the electric power can be set at 30 sccm, 20 mTorr and 400 W respectively, for example. Under such conditions, the etching rate is 1000 Å/min., for example.

As hereinabove described, the etching with HBr gas is superior to that employing $Cl_2$ gas in selection ratio with respect to the resist film 30. Therefore, the resist film 30 hardly loses its weight, and accurate etching can be carried out. Further, the HBr gas is changed for the $Cl_2$ gas in the final stage of the etching steps, whereby a deposit caused by the HBr gas can be removed so that a clean surface can be attained after the etching.

Figure 2:
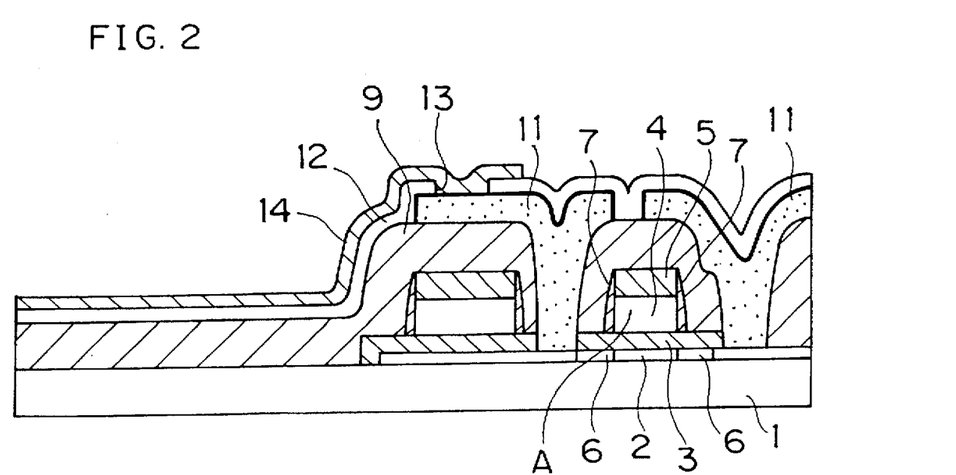
FIG. 2 is a sectional view showing a transparent electrode film being etched into the shape of a pixel electrode by the etching step shown in FIG. 1.

FIG. 2 illustrates in which a state that the resist film 30 is removed after completion of the aforementioned etching steps. As shown in FIG. 2, the ITO film 14 is left only on the region which has been provided with the resist film 30.

Figure 3:
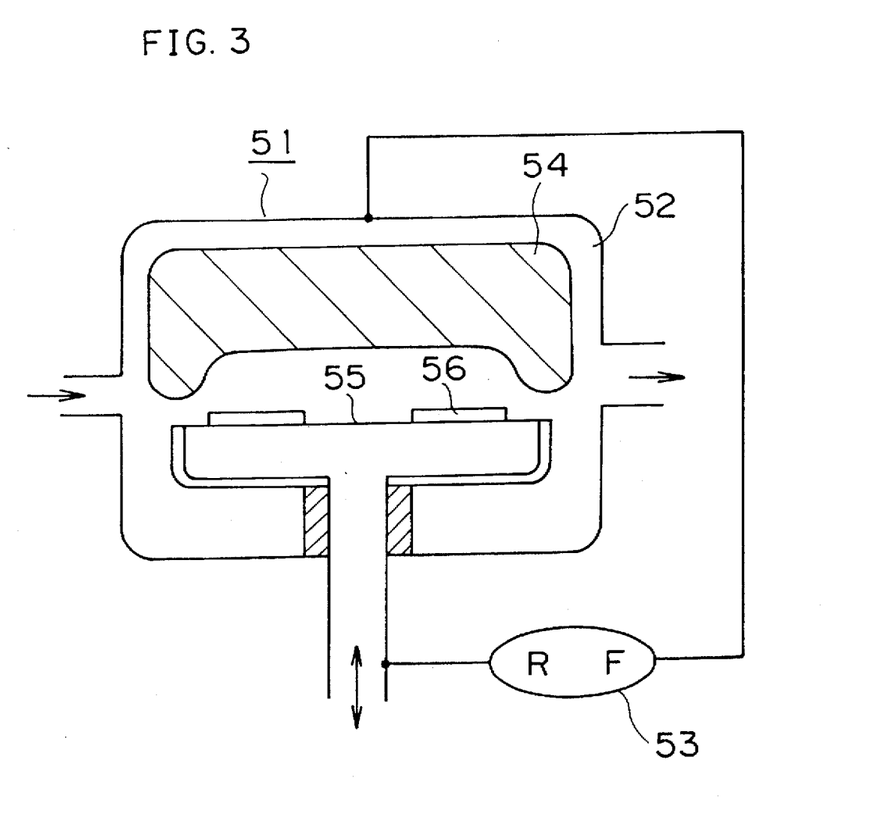
FIG. 3 is a schematic block diagram showing an exemplary reactive ion etching device.

FIG. 3 is a schematic block diagram showing an exemplary reactive ion etching device 51. Referring to FIG. 3, an etching chamber 52 is brought into a prescribed pressure state, and a reaction gas is introduced into this chamber 52. A cathode 55 is provided in the etching chamber 52, and a substrate 56 to be treated is placed on this cathode 55. The cathode 55 and an anode (not shown) form a pair of parallel flat plates. When high-frequency power is applied from a high-frequency power source 53 across the cathode 55 and the anode in the reactive ion etching device 51, discharge is caused to generate a plasma 54. In this plasma 54, the gas dissociates due to collision with electrons which are accelerated by an electric field. Cations dissociating in the plasma are accelerated by the electric field, to collide with the surface of the treated substrate 56. Etching is carried out by such collision of the cations.

The etching gas can be changed by replacing the gas which is supplied into the etching chamber 52. The cathode 55 is supplied with water, to be water-cooled.

FIGS. 4 to 10 illustrate steps of fabricating a pixel driving part of the liquid crystal display device shown in FIG. 1. The fabrication steps are now described.

Step 1

Figure 4:
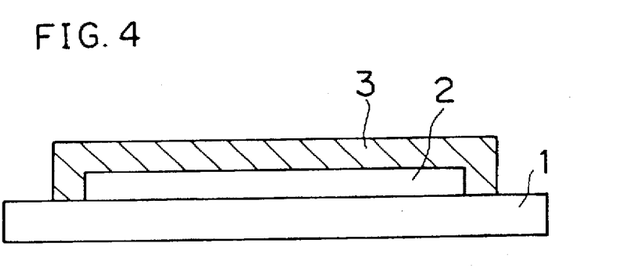
FIG. 4 is a sectional view showing a step of fabricating a pixel driving part of a liquid crystal display device.

Referring to FIG. 4, an amorphous silicon film of 500 Å in thickness is formed on an insulating substrate 1 of quartz glass, for example, by ordinary low pressure CVD. Further, a heat treatment is carried out in a nitrogen ($N_2$) atmosphere at a temperature of about 600° C. for about 20 hours, for forming a polycrystalline silicon film 2 by solid phase epitaxy of the amorphous silicon film.

In this polycrystalline silicon film 2, a number of defects such as dislocations are present in the crystals forming the film and amorphous parts are left between the crystals, and hence the amount of a leakage current may be increased.

Therefore, the substrate 1 is further introduced into an electric furnace, and heat treated in nitrogen ($N_2$) atmosphere at a temperature of 1050° C. for about 2 hours.

Thus, the quality of the polycrystalline silicon film 2 is improved.

In order to use the polycrystalline silicon film 2 as an active layer of a thin-film transistor, the polycrystalline film 2 is then patterned into a prescribed shape by photolithography and dry etching by RIE.

Then, an HTO (high-temperature oxide: silicon oxide) film 3 for serving as a gate insulating film is deposited on the polycrystalline silicon film 2 by low pressure CVD. Then, the device is introduced into an electric furnace, and heat treated in an $N_2$ atmosphere at a temperature of 1050° C. for 2 hours.

Step 2

Figure 5:
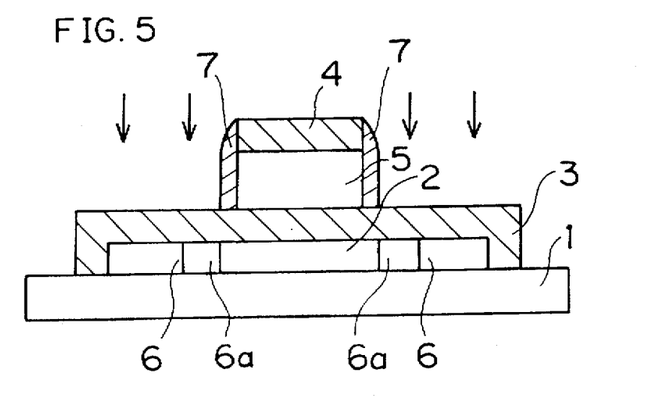
FIG. 5 is a sectional view showing another step of fabricating the pixel driving part of the liquid crystal display device.

Referring to FIG. 5, a polycrystalline silicon film 5 is deposited on the gate insulating film 3 by low pressure CVD, thereafter an impurity is implanted into the polycrystalline silicon film 5, and a further heat treatment is carried out to activate the impurity.

Then, a silicon oxide film 4 is deposited on this polycrystalline silicon film 5 by normal pressure CVD. Then, the polycrystalline silicon film 5 and the silicon oxide film 4 are patterned into prescribed shapes by photolithography and dry etching by RIE. The polycrystalline silicon film 5 is used as a gate electrode.

An HTO film is deposited on the gate insulating film 3 and the silicon oxide film 4 by low pressure CVD. The overall HTO film is anisotropically etched back to form side walls 7 on side surfaces of the gate electrode 5 and the silicon oxide film 4. Then, an impurity is implanted into an LDD (lightly doped drain) region 6a and source/drain regions 6 in the polycrystalline silicon film 2 by self alignment, and a further heat treatment is carried out to activate the impurity.

Step 3

Figure 6:
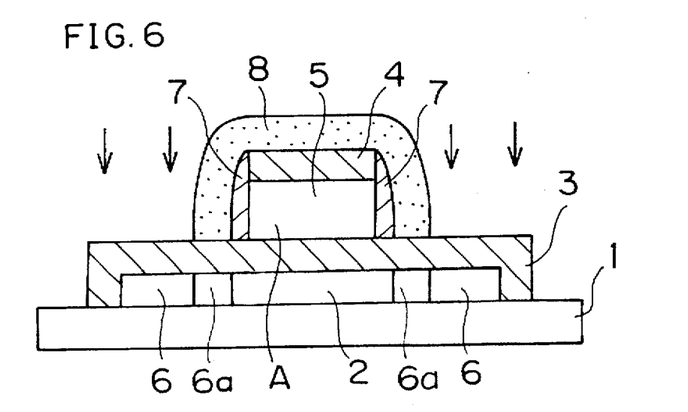
FIG. 6 is a sectional view showing a step of fabricating the pixel driving part of the liquid crystal display device.

Referring to FIG. 6, the side walls 7 and the silicon oxide film 4 are covered with a resist film 8, and an impurity is implanted into the polycrystalline silicon film 5 by self alignment using the resist film 8 serving as a mask, thereby forming the LDD structure. The LDD region 6a is not shown in the drawings of the following steps.

Step 4

Figure 7:
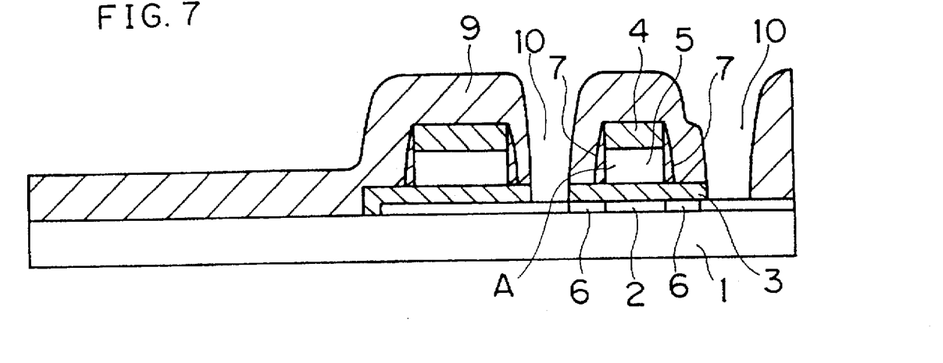
FIG. 7 is a sectional view showing a step of fabricating the pixel driving part of the liquid crystal display device.

The resist film 8 is removed, and thereafter a silicon oxide film and a BPSG film having flowability for partially forming an interlayer insulating film 9 are continuously deposited on the overall surface of the device by normal pressure CVD, as shown in FIG. 7. Then, the device is introduced into an electric furnace and heated to a temperature of 900° C., to make the BPSG film reflow. Due to this heat treatment, the source/drain regions 6 are simultaneously activated. Thus, a thin-film transistor A is formed.

The BPSG film has inferior resist separability and easily absorbs water. Therefore, a silicon oxide film is further deposited on the BPSG film by normal pressure CVD, for serving as a protective film therefor. Thus, the interlayer insulating film 9 is formed in a three-layer structure of the silicon oxide film/the BPSG film/the silicon oxide film.

Then, the device is introduced into an electric furnace and heated in a hydrogen ($H_2$) atmosphere at a temperature of 450° C. for 12 hours, to be subjected to a hydrogen plasma treatment. Due to such hydrogenation, hydrogen atoms are bonded to the crystal defect parts of the polycrystalline silicon film 2 to stabilize the crystal structure, thereby improving field effect mobility.

Then, contact holes 10 are formed in the interlayer insulating film 9 to be in contact with the source/drain regions 6, by photolithography and dry etching by RIE.

Step 5

Figure 8:
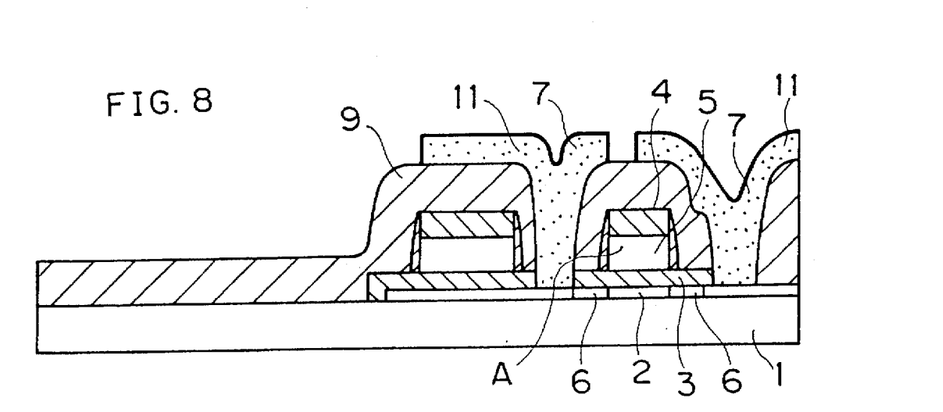
FIG. 8 is a sectional view showing a step of fabricating the pixel driving part of the liquid crystal display device.

Referring to FIG. 8, a wiring layer is formed by stacking an Al—Si alloy and Ti with each other by magnetron sputtering. This wiring layer is worked into a source/drain region 11 by photolithography and dry etching by RIE.

Step 6

Figure 9:
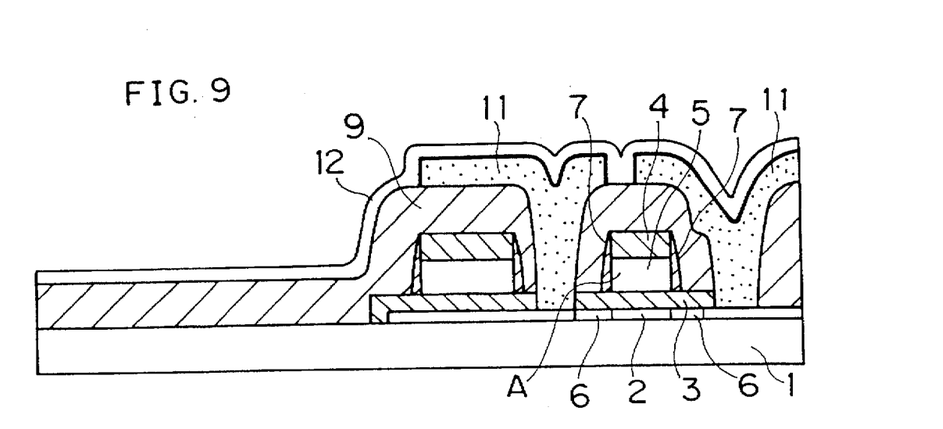
FIG. 9 is a sectional view showing a step of fabricating the pixel driving part of the liquid crystal display device.

Referring to FIG. 9, a silicon oxide film 12 is deposited on the overall surface of the device by normal pressure CVD, for serving as a protective film.

Step 7

Figure 10:
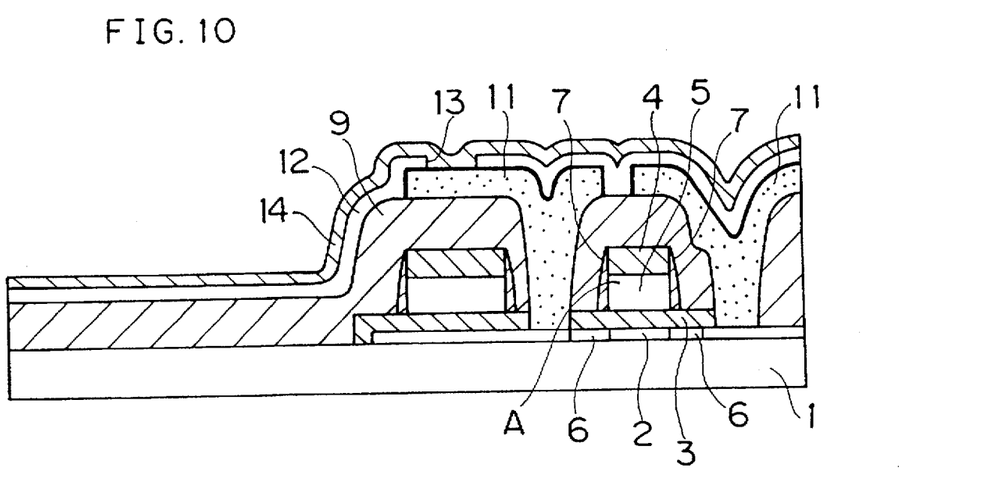
FIG. 10 is a sectional view showing a step of fabricating the pixel driving part of the liquid crystal display device.

Referring to FIG. 10, a contact hole 13 is formed in the silicon oxide film 12 to communicate with the source/drain electrode 11 by photolithography and dry etching by RIE. Then, an ITO film 14 serving as a transparent electrode film is formed on the overall surface of the device, i.e., on the silicon oxide film 12 and in the contact hole 13, by sputtering. This ITO film 14 defines a pixel electrode.

Step 8

The pixel part of the liquid crystal display device having the ITO film 14 shown in FIG. 1 is formed in the aforementioned manner. As described with reference to FIG. 1, the patterned resist film 30 is formed on the ITO film 14. Then, HBr gas and Cl₂ gas are employed as the first and second etching gases, to etch the ITO film 14 by RIE, as already described.

Due to such change of the etching gas, the ITO film 14 is accurately etched in a state having a clean surface.

Due to such etching, the ITO film 14 is etched and patterned into the shape of a pixel electrode, as described with reference to FIG. 2.

Step 9

Figure 11:
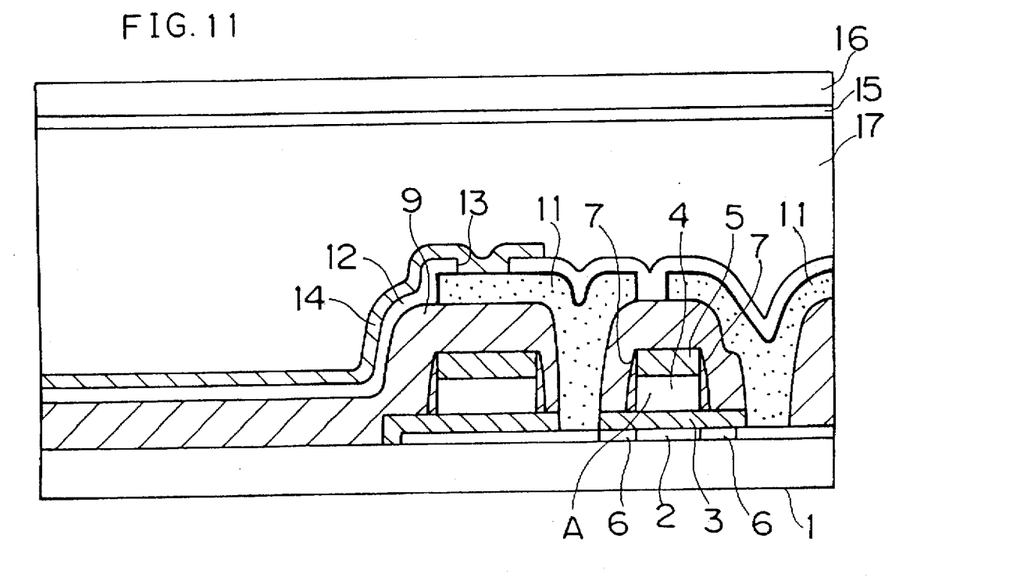
FIG. 11 is a sectional view showing a step of fabricating the pixel driving part of the liquid crystal display device.

The substrate of a liquid crystal display device having a thin-film transistor is formed in the aforementioned manner. Referring to FIG. 11, a common electrode 15 is formed on a transparent insulating substrate 16, as an opposite substrate. The insulating substrate 16 having the common electrode 15 and the substrate 1 having the thin-film transistor are opposed to each other and liquid crystals are sealed therebetween, for forming a liquid crystal layer 17.

Thus, the pixel part of the liquid crystal display device is completed.

Figure 12:
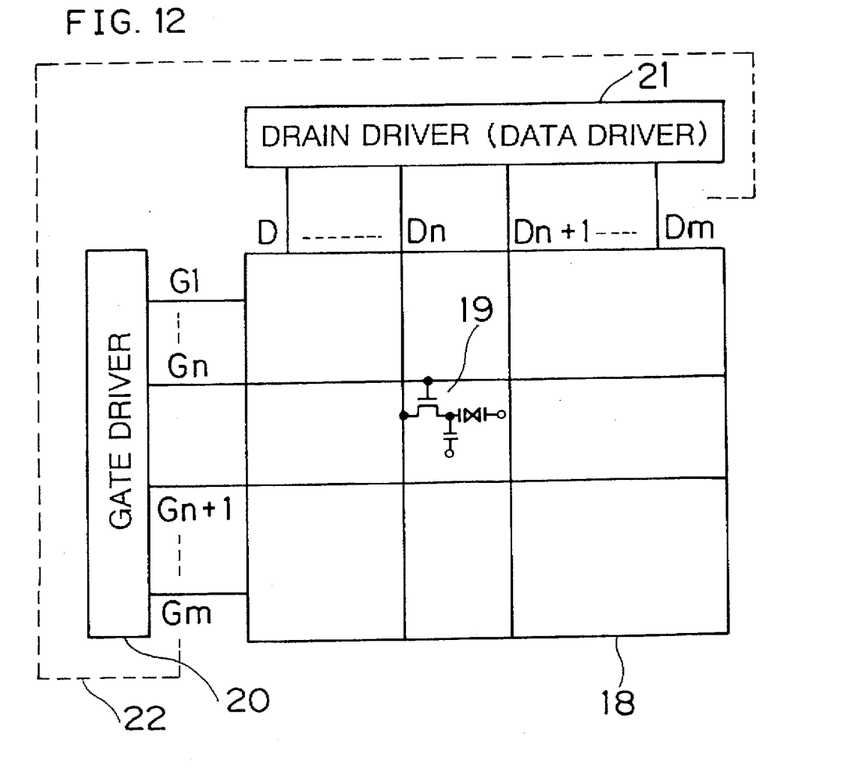
FIG. 12 is a block diagram showing an active matrix system liquid crystal display device.

FIG. 12 is a block diagram showing the aforementioned active matrix system liquid crystal display device.

Referring to FIG. 12, scanning lines (gate wires) G1 ... Gn and Gn+1 ... Gm and data lines (drain wires) D1 ... Dn and Dn+1 ... Dm are arranged in a pixel part 18. Each gate wire perpendicularly intersects with each drain wire, so that a pixel 19 is provided on the intersection therebetween. Each gate wire is connected to a gate driver 20, so that a gate signal (scan signal) is applied thereto. On the other hand, each drain wire is connected to a drain driver (data driver) 21, so that a data signal (video signal) is applied thereto. A peripheral driving circuit 22 is formed by these drivers 20 and 21.

A liquid crystal display device in which at least one of the drivers 20 and 21 is formed on the same substrate as the pixel part 18 is generally called a driver-integrated (driver containing) liquid crystal display device. The gate driver 20 may be provided on each end of the pixel part 18. Further, the drain driver 21 may be provided on each side of the pixel part 18.

Figure 13:
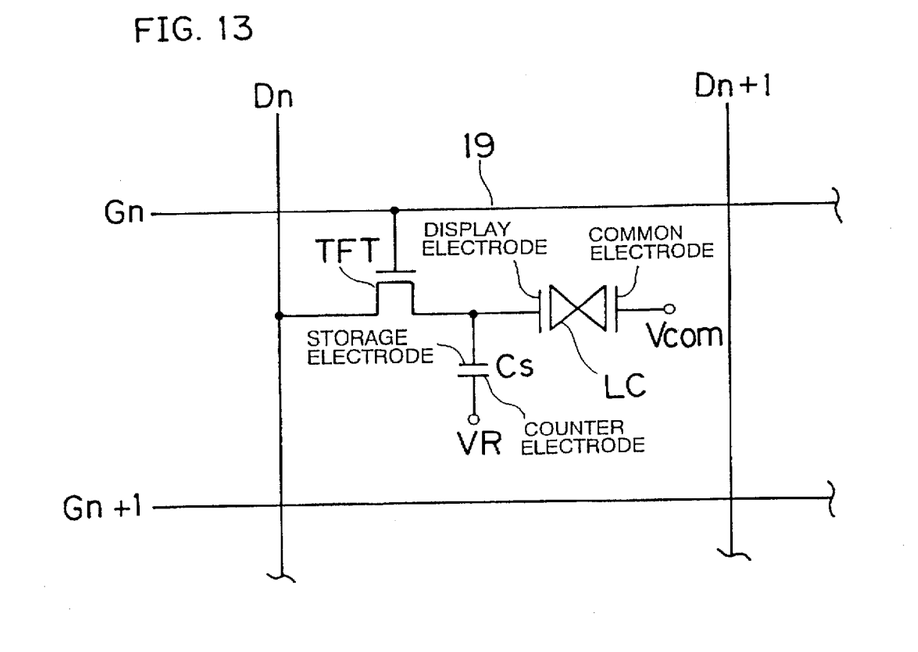
FIG. 13 is an equivalent circuit diagram of a pixel part of the active matrix system liquid crystal display device.

FIG. 13 shows an equivalent circuit of each pixel 19. Referring to FIG. 13, the pixel 19 is provided on the intersection between the gate wire Gn and the drain wire Dn. The pixel 19 is formed by a TFT (thin-film transistor) serving as a pixel driving element, a liquid crystal cell LC, and an auxiliary capacitance CS. The gate and the drain of the TFT are connected to the gate wire Gn and the drain wire Dn respectively. A display electrode (pixel electrode) of the liquid crystal cell LC and the auxiliary capacitance (storage or additional capacitance) CS are connected to the source of the TFT.

The liquid crystal cell LC and the auxiliary capacitance CS form a signal storage element. A voltage Vcom is applied to a common electrode (electrode opposite to the display electrode) of the liquid crystal cell LC. In the auxiliary capacitance CS, on the other hand, a constant voltage VR is applied to an electrode which is opposite to that connected with the source of the TFT. The common electrode of the liquid crystal cell LC is literally common to all pixels 19. An electrostatic capacitance is formed across the display electrode and the common electrode of the liquid crystal cell LC. In the auxiliary capacitance CS, the electrode which is opposite to that connected with the source of the TFT may be connected with the adjacent gate wire Gn+1.

When the gate wire Gn is set at a positive voltage to apply the positive voltage to the gate of the TFT in the pixel 19 having the aforementioned structure, the TFT is turned on. Thus, the electrostatic capacitance of the liquid crystal cell LC and the auxiliary capacitance CS are charged by a data signal which is applied to the drain wire Dn. When the gate wire Gn is set at a negative voltage to apply the negative voltage to the gate of the TFT, on the other hand, the TFT is turned off and a voltage which has been applied to the drain wire Dn is held by the electrostatic capacitance of the liquid crystal cell LC and the auxiliary capacitance CS.

As hereinabove described, it is possible to make the pixel 19 hold an arbitrary data signal by supplying the drain wire with a data signal to be written in the pixel 19 and controlling the voltage of the gate wire. The transmittance of the liquid crystal cell LC changes in response to the data signal which is held by the pixel 19, to display a picture.

Important characteristics of the pixel 19 are writability and holdability. With respect to the writability, required is a point whether or not a desired video signal voltage can be sufficiently written in the signal storage element (the liquid crystal cell LC and the auxiliary capacitance CS) in a unit time which is set from the specification of the pixel part 18. With respect to the holdability, on the other hand, required is a point whether or not a video signal voltage once written in the signal storage element can be held for a necessary time.

The auxiliary capacitance CS is provided in order to increase the electrostatic capacitance of the signal storage element thereby improving the writability and the holdability. In the liquid crystal cell LC, increase of the electrostatic capacitance is limited due to its structure. Thus, the auxiliary capacitance CS makes up for the insufficient electrostatic capacitance of the liquid crystal cell LC.

Figure 14:
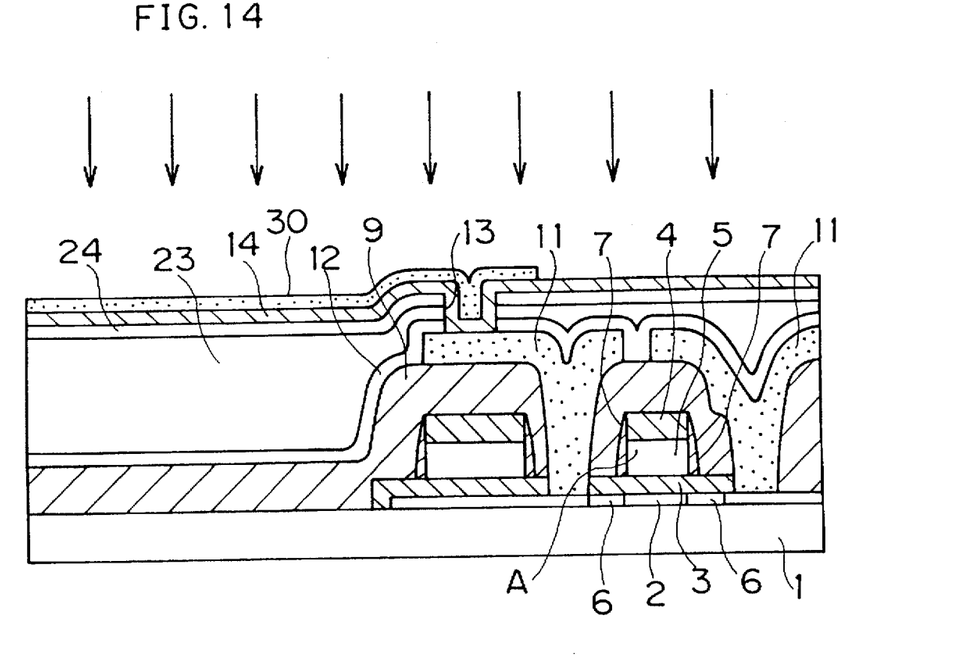
FIG. 14 is a sectional view showing another embodiment of the dry etching method according to the present invention.

FIG. 14 is a sectional view showing another embodiment of the present invention. In the embodiment shown in FIG. 14, an SOG (spin on glass) film 23 is formed on a silicon oxide film 12, and another silicon oxide film 24 is further deposited on the SOG film 23. The silicon oxide film 12, the SOG film 23 and the silicon oxide film 24 are provided with a contact hole 13 communicating with a source/drain electrode, and an ITO film 14 is formed in the contact hole 13 and on the silicon oxide film 24. A patterned resist film 30 is formed on the ITO film 14.

In the aforementioned state, HBr gas is employed as a first etching gas, for etching the ITO film 14 by RIE. Similarly to the embodiment shown in FIG. 1, the etching gas is changed to Cl₂ gas, which is a second etching gas, when the silicon film 24 which is the underlayer of the ITO film 14 starts being exposed, and the etching is continued to the end.

Similarly to the embodiment shown in FIG. 1, the etching can be accurately carried out in a state with excellent selectivity for the resist film 30 due to the employment of the HBr gas. Further, the HBr gas is changed to the Cl₂ gas in the final stage of the etching, whereby a clean surface state can be attained with no deposition of HBr.

Figure 15:
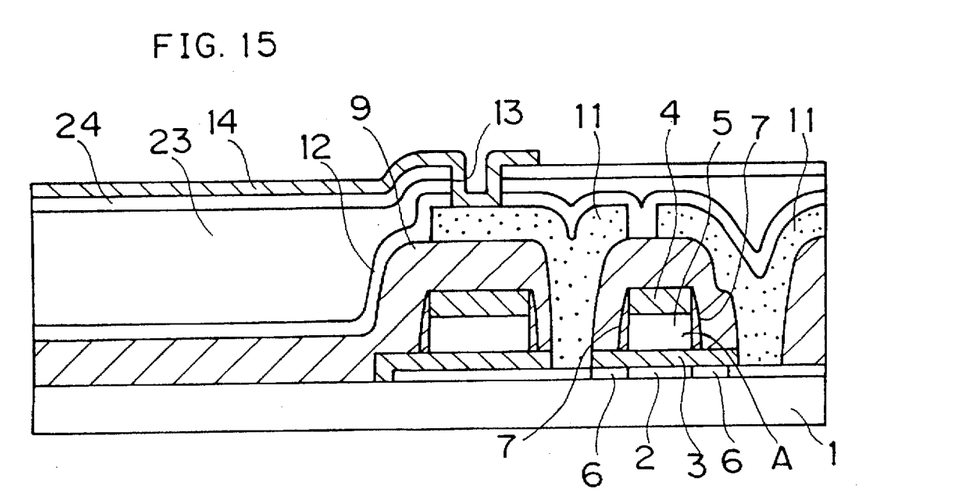
FIG. 15 is a sectional view showing a state of etching a transparent electrode film into the shape of a pixel electrode by the etching step shown in FIG. 14.

FIG. 15 shows a state after the etching step shown in FIG. 14. As shown in FIG. 15, the ITO film 14 is so patterned that the same is left only in a portion of a pixel electrode.

Figure 16:
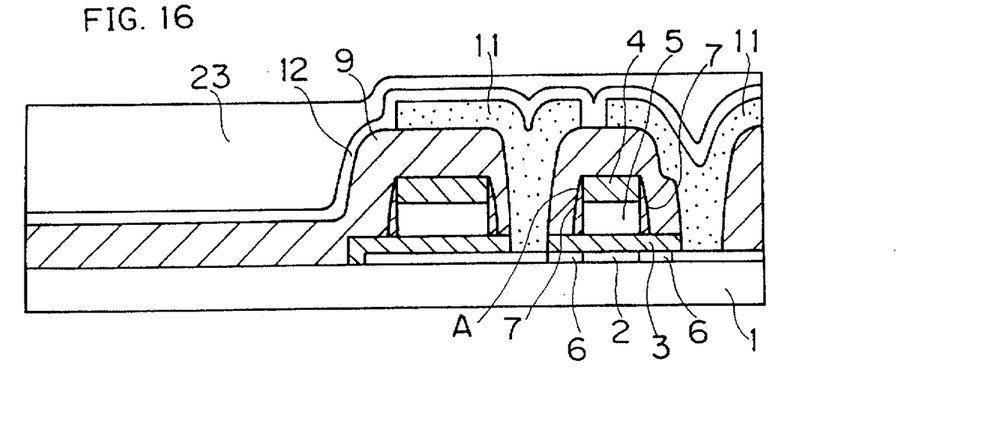
FIG. 16 is a sectional view showing a step of fabricating a pixel driving part of another liquid crystal display device.
Figure 17:
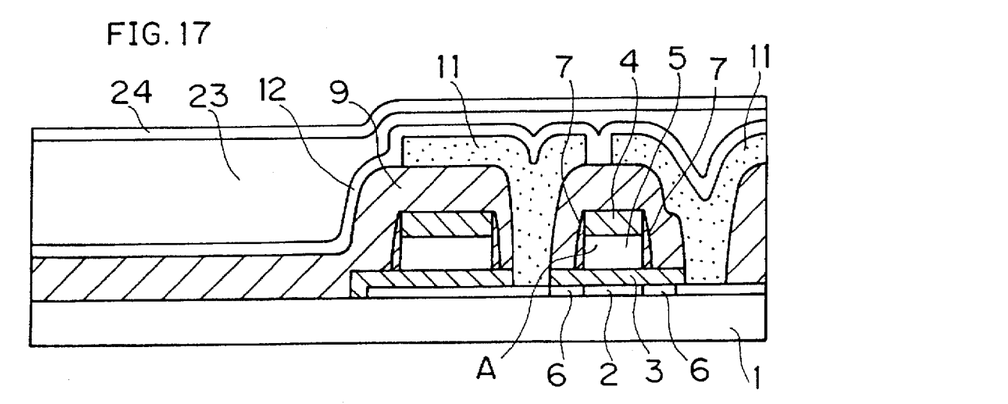
FIG. 17 is a sectional view showing a step of fabricating the pixel driving part of the liquid crystal display device.
Figure 18:
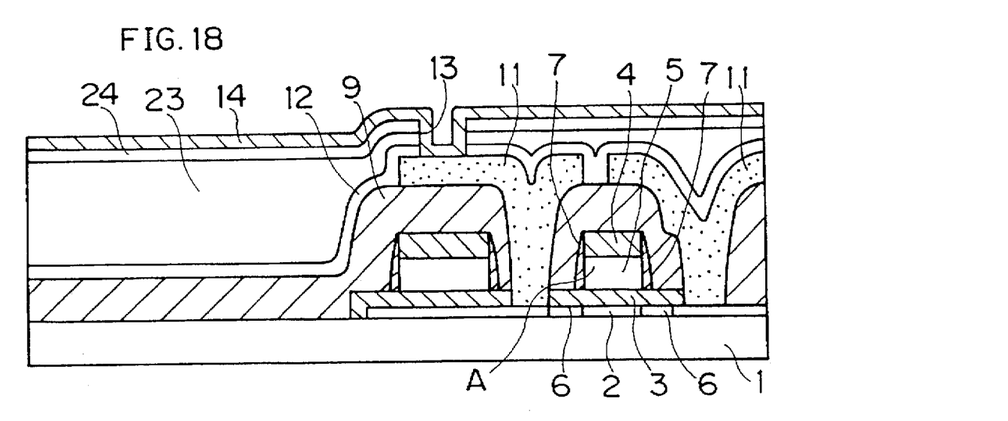
FIG. 18 is a sectional view showing a step of fabricating the pixel driving part of the liquid crystal display device.

FIGS. 16 to 18 are sectional views showing steps of fabricating the pixel part shown in FIG. 14. The following steps 10 to 13 are carried out following the step 6 shown in FIG. 9.

Step 10

Referring to FIG. 16, the SOG film 23 is applied onto the overall surface of the silicon oxide film 12 over 3 times, to flatten the device surface.

Step 11

The SOG film 23 has inferior resist separability and easily absorbs water. Therefore, the silicon oxide film 24 is thinly deposited on the SOG film 23 by normal pressure CVD as a protective film, as shown in FIG. 17.

Step 12

Referring to FIG. 18, the contact hole 13 communicating with the source/drain electrode 6 is formed in the three-layer structure of the silicon oxide film 12/the SOG film 23/the silicon oxide film 24 by photolithography and dry etching by RIE. Then, the ITO film 14 for serving as a pixel electrode is deposited on the overall surface of the device by sputtering.

Step 13

Referring to FIG. 14, the patterned resist film 30 is formed on the ITO film 14. Then, HBr gas and $Cl_2$ gas are successively employed as etching gases as hereinabove described, thereby etching the device by RIE.

While the first etching gas is prepared from HBr gas in each of the aforementioned embodiments shown in FIGS. 1 and 14, the same may alternatively be prepared from HI gas. Also in this case, etching can be carried out with excellent selectivity for the resist film. Further, a deposit caused by the HI gas can be removed by carrying out etching with the $Cl_2$ gas, which is the second etching gas.

While the chlorine containing gas is prepared from $Cl_2$ gas in each of the aforementioned embodiments, the same may alternatively be prepared from $BCl_3$ gas. When $Cl_2$ gas and $BCl_3$ gas are employed in a mixed state, the flow rates of the $Cl_2$ gas and the $BCl_3$ gas, the etching chamber pressure and the electric power may be set at 5 sccm, 25 sccm, 20 mTorr and 400 W respectively as etching conditions, for example. In this case, the etching rate is about 800 Å/min., for example.

In each of the aforementioned embodiments, the first etching gas is changed to the chlorine containing gas, to carry out the etching. If selectivity for the resist film is not particularly required, however, the etching can be made with the chlorine containing gas throughout the etching steps. In each of the embodiments shown in FIGS. 1 and 14, the etching may be carried out with $Cl_2$ gas throughout the etching steps, for example. Also when the $Cl_2$ gas is employed throughout the steps, neither the substrate surface nor the etching chamber is contaminated. Thus, a clean surface can be attained in a state after the etching.

According to the present invention, a gas containing HBr or HI may be prepared from a mixed gas of HBr gas or HI gas and chlorine containing gas. In this case, the content of the HBr gas or the HI gas is preferably at least 80 volume percent.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dry etching method comprising the steps of:
    etching a transparent electrode film by reactive ion etching with a first etching gas; and
    changing said first etching gas for a second etching gas and etching said transparent electrode film by reactive ion etching with said second etching gas,
    a chlorine containing gas being employed as said second etching gas.

2. The dry etching method in accordance with claim 1, wherein said etching step with said second etching gas is continued to carry out said etching up to completion thereof.

3. The dry etching method in accordance with claim 1, wherein a gas containing hydrogen bromide (HBr) is employed as said first etching gas.

4. The dry etching method in accordance with claim 1, wherein a gas containing hydrogen iodide (HI) is employed as said first etching gas.

5. The dry etching method in accordance with claim 1, wherein said chlorine containing gas is $Cl_2$ gas, $BCl_3$ gas or a mixed gas thereof.

6. The dry etching method in accordance with claim 1, wherein said transparent electrode film is a film containing $In_2O_3$.

7. The dry etching method in accordance with claim 1, wherein said transparent electrode film is an ITO film.

8. The dry etching method in accordance with claim 1, wherein a patterned resist film is provided on a portion of said transparent electrode film, and a region of said transparent electrode film not provided with said resist film is etched.

9. A method of fabricating a semiconductor device, comprising the steps of:
    forming a semiconductor switching element having an electrode part;
    forming an insulating film on said semiconductor switching element;
    forming a contact hole in said insulating film for providing electrical continuity with said electrode part of said semiconductor switching element;
    forming a transparent electrode film in said contact hole and on said insulating film;
    forming a patterned resist film on a portion of said transparent electrode film;
    etching a region of said transparent electrode film that is not provided with said resist film by reactive ion etching with a first etching gas; and
    changing said first etching gas for a chlorine containing gas being a second etching gas and etching said region of said transparent electrode film by reactive ion etching with said second etching gas.

10. The method of fabricating a semiconductor device in accordance with claim 9, wherein said etching step with said second etching gas is continued to carry out said etching up to completion thereof.

11. The method of fabricating a semiconductor device in accordance with claim 9, wherein a gas containing hydrogen bromide (HBr) is employed as said first etching gas.

12. The method of fabricating a semiconductor device in accordance with claim 9, wherein a gas containing hydrogen iodide (HI) is employed as said first etching gas.

13. The method of fabricating a semiconductor device in accordance with claim 9, wherein said chlorine containing gas is $Cl_2$ gas, $BCl_3$ gas or a mixed gas thereof.

14. The method of fabricating a semiconductor device in accordance with claim 9, wherein said transparent electrode film is a film containing $In_2O_3$.

15. The method of fabricating a semiconductor device in accordance with claim 9, wherein said transparent electrode film is an ITO film.

16. The method of fabricating a semiconductor device in accordance with claim 9, wherein said semiconductor switching element is a thin-film transistor element or an MIM element.

17. The method of fabricating a semiconductor device in accordance with claim 9, wherein said semiconductor device is a pixel driving part of a liquid crystal display device.

18. A method of fabricating a liquid crystal display device, comprising the steps of:

forming a semiconductor switching element, having an electrode part, for driving pixels;

forming an insulating film on said semiconductor switching element;

forming a contact hole in said insulating film for providing electrical continuity with said electrode part of said semiconductor switching element;

forming a transparent electrode film in said contact hole and on said insulating film;

forming a patterned resist film on a portion of said transparent electrode film for patterning said transparent electrode film into the shape of a pixel electrode;

etching a region of said transparent electrode film that is not provided with said resist film by reactive ion etching with a first etching gas; and changing said first etching gas for a chlorine containing gas being a second etching gas and etching said region of said transparent electrode film into the shape of said pixel electrode by reactive ion etching with said second etching gas.

* * * * *